(12) United States Patent
Gomila et al.

(10) Patent No.: US 7,852,409 B2
(45) Date of Patent: Dec. 14, 2010

(54) BIT-ACCURATE SEED INITIALIZATION FOR PSEUDO-RANDOM NUMBER GENERATORS USED IN A VIDEO SYSTEM

(75) Inventors: Cristina Gomila, Mercer, NJ (US); Joan Llach, Mercer, NJ (US); Jeffrey Allen Cooper, Somerset, NJ (US); Jill MacDonald Boyce, Monmouth, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1430 days.

(21) Appl. No.: 11/273,067

(22) Filed: Nov. 14, 2005

(65) Prior Publication Data

US 2006/0114988 A1 Jun. 1, 2006

Related U.S. Application Data

(60) Provisional application No. 60/628,500, filed on Nov. 16, 2004.

(51) Int. Cl.
*G06F 7/58* (2006.01)
*H04N 9/74* (2006.01)

(52) U.S. Cl. ........................ 348/578; 708/250
(58) Field of Classification Search .......... 348/239, 348/578; 352/85; 708/250
See application file for complete search history.

(56) References Cited

U.S. PATENT DOCUMENTS

| 4,935,816 | A | 6/1990 | Faber |
|---|---|---|---|
| 5,140,414 | A | 8/1992 | Mowry |
| 5,335,013 | A | 8/1994 | Faber |
| 5,374,954 | A | 12/1994 | Mowry |
| 5,406,326 | A | 4/1995 | Mowry |
| 5,457,491 | A | 10/1995 | Mowry |
| 5,471,572 | A | 11/1995 | Buchner |
| 5,475,425 | A | 12/1995 | Przyborski et al. |
| 5,629,769 | A | 5/1997 | Cookingham et al. |
| 5,641,596 | A | 6/1997 | Gray et al. |
| 5,687,011 | A | 11/1997 | Mowry |
| 5,709,972 | A | 1/1998 | Cookingham et al. |
| 5,767,860 | A | 6/1998 | Zimmer et al. |
| 5,831,673 | A | 11/1998 | Przyborski et al. |

(Continued)

FOREIGN PATENT DOCUMENTS

EP 0622000 8/2000

(Continued)

OTHER PUBLICATIONS

Office Action from U.S. Appl. No. 10/556,834 mailed Aug. 19, 2008.

(Continued)

*Primary Examiner*—Jon Chang
(74) *Attorney, Agent, or Firm*—Robert D. Shedd; Guy H. Eriksen; Robert B. Levy (57) ABSTRACT

There are provided methods and apparatus for bit-accurate seed initialization for pseudo-random number generators used in a video system. A method includes the steps of creating (205) a look-up table of PRNG seeds, and initializing (210) one of the PRNG seeds from the look-up table for a picture by accessing the look-up table using a value corresponding to an order of the picture.

45 Claims, 5 Drawing Sheets

U.S. PATENT DOCUMENTS

| | | | |
|---|---|---|---|
| 6,219,838 | B1 | 4/2001 | Cherichetti et al. |
| 6,269,180 | B1 | 7/2001 | Sevigny |
| 2002/0034337 | A1 | 3/2002 | Shekter |
| 2006/0082649 | A1* | 4/2006 | Gomila et al. ............... 348/104 |
| 2006/0083426 | A1* | 4/2006 | Cooper et al. ............... 382/181 |
| 2006/0104608 | A1* | 5/2006 | Llach et al. .................... 386/68 |
| 2006/0183275 | A1* | 8/2006 | Schoner et al. ............. 438/166 |
| 2007/0070241 | A1* | 3/2007 | Boyce et al. ................. 348/441 |

FOREIGN PATENT DOCUMENTS

| | | |
|---|---|---|
| EP | 1175091 | 1/2002 |
| EP | 1215624 | 6/2002 |
| WO | WO9314591 | 7/1993 |
| WO | 9722204 A2 | 6/1997 |
| WO | WO9722204 | 6/1997 |
| WO | WO0146992 | 6/2001 |
| WO | WO0177871 | 10/2001 |
| WO | WO2004104931 | 12/2004 |

OTHER PUBLICATIONS

Office Action from U.S. Appl. No. 10/556,834 mailed Feb. 20, 2009.
Notice of Non-Compliant Amendment for U.S. Appl. No. 10/556,834 mailed Jun. 16, 2009.
Office Action from U.S. Appl. No. 10/569,318 mailed Aug. 15, 2008.
Office Action from U.S. Appl. No. 10/569,318 mailed Feb. 13, 2009.
Office Action from U.S. Appl. No. 10/569,318 mailed Jul. 31, 2009.
Office Action from U.S. Appl. No. 10/572,820 mailed Jun. 1, 2009.
Office Action from U.S. Appl. No. 10/571,148 mailed Apr. 15, 2009.
Office Action from U.S. Appl. No. 10/575,676 mailed Dec. 15, 2008.
Office Action from U.S. Appl. No. 10/575,676 mailed Mar. 13, 2009.
Office Action from U.S. Appl. No. 11/246,848 mailed Jun. 26, 2009.
Office Action from U.S. Appl. No. 11/252,177 mailed May 29, 2008.
Office Action from U.S. Appl. No. 11/252,177 mailed Nov. 5, 2008.
Office Action from U.S. Appl. No. 11/252,177 mailed Apr. 17, 2009.
Office Action from U.S. Appl. No. 11/252,177 mailed Sep. 18, 2009.
Gomila, Christina, et al. "SEI Message for Film Grain Encoding" Joint Video Team (JVT) of ISO/IEC MPEG & ITU-T VCEG (ISO/IEC JTC1/SC29/WG11 and ITU-T SG16 Q6), May 23, 2003, pp. 1-14, XP002308742.
Schlockermann M et al. "Film Grain Coding in H.264/AVC" Joint Video Team (JVT) of ISO/IEC MPEG & ITU-T VCEG (ISO/IEC JTC1/SC29/WG11 and ITU-T SG16 Q6), Sep. 2, 2003, pp. 1-8, XP002311238.
McLean, I, et al., "Telecine Noise Reduction", IEE Seminar Digital Restoration of Film and Video Archives (ref. No. 01/049), IEE Seminar Digital Restoration of Film and Video Archives, Jan. 16, 2001, London, UK, pp. 2/1-2/6.
Yan, Jacky Chun Kit, "Film Grain Noise Removal and Generation for Color Images",1997 IEEE Signal Processing Workshop on Higher-Order Statistics, Jul. 21-23, Banff, Alberta, Canada. pp. 73-76.

Yan, Jacky Chun Kit, et al. "Signal Dependent Film Grain Noise Removal and Generation Based on Higher-Order Statistics", 1997 IEEE Signal Processing Workshop on Higher-Order Statistics, Jul. 21-23, Banff, Alberta, Canada. pp. 77-81.
Al-Shaykh, Osama K., et al., "Restoration of Lossy Compressed Noisy Images", IEEE Transactions of Image Processing, vol. 8. No. 10, pp. 1348-1360, Oct. 1999.
Al-Shaykh, Osama K, et al. "Lossy Compression of Images Corrupted by Film Grain Noise", Proceedings International Conference on Image Processing, Sep. 16-19, 1996, Lausanne, Switzerland vol. I of III, pp. 805-808.
Campisi, P, et al. "Signal-dependent film grain noise generation using homomorphic adaptive filtering.", IEE Proceedings Vision, Image and Signal Processing, vol. 147, No. 3 pp. 283-287 Jun. 2000.
Yoshida, J, "Go with the Grain, Film R&D Chief Urges, for Art's Sake", EETimes, http://www.eetimes.com/showArticle.jhtml?articleID=59301182 (last checked Jul. 23, 2007).
Zhao, Lifeng, et al., "Constant Quality Rate Control for Streaming MPEG-4 FGS Video", IEEE, 2002, pp. 544-547.
Al-Shaykh, Osama K, et al., "Lossy Compression of Noisy Images", IEEE Transactions on Image Processing vol. 7, No. 12, Dec. 1998, pp. 1641-1652.
Brightwell, PJ, et al., "Automated Correction of Film Unsteadiness, Dirt and Grain", International Broadcasting Convention, Sep. 16-20, 1994 Conference Publication, No. 397.
Oktem, R, et al., "Transform Domain Algorithm for Reducing Effect of Film Grain Noise in Image Compression", Electronics Letters, vol. 35, No. 21, Oct. 14, 1999, pp. 1830-1831.
Fischer, Marco, et al., "Image Sharpening Using Permutation Weighted Medians", Dept of Electrical Engineering, University of Delware Newark, DE, pp. 1-4, 2000.
Shahnaz, Rubeena, et al., "Image Compression in Signal-Dependent Noise", Applied Optics, vol. 38, No. 26, Sep. 10, 1999, pp. 5560-5567.
Chavel, P., et al., "Film Grain Noise in Partially Coherent Imaging", Optical Engineering, vol. 19, No. 3, May/Jun. 1980, pp. 404-410.
Zhang, Xi Min, et al., "Constant Quality Constrained Rate Allocation for FGS Video Coded Bitstreams", Proceedings of SPIE, vol. 4671, pp. 817-827, 2002.
Peng, Sharon, et al., Adaptive Frequency Weighting for Fine-Granularity-Scalability, Proceedings of SPIE, vol. 4671, pp. 840-849, 2002.
Van Der Schaar, M., et al., "Fine-Granularity for Wireless Video and Scalable Storage", Proceedings of SPIE vol. 4671, pp. 805-816, 2002.
Prades-Nebot, Josep, et al., "Rate Control for Fully Fine Grained Scalable Video Coders", Proceedings of SPIE, vol. 4671, pp. 828-839, 2002.
Yan, Rong, et al., "Efficient Video Coding with Hybrid Spatial and Fine Grain SNR Scalabilities", Proceedings of SPIE vol. 4671, pp. 850-859, 2002.

* cited by examiner

| FRAME | I2 | B0 | B1 | P5 | B3 | B4 | P8 | B6 | B7 | I11 | B9 | B10 | P14 | B12 | B13 | I17 | B15 | B16 | P20 | B18 | B19 |
|---|---|---|---|---|---|---|---|---|---|---|---|---|---|---|---|---|---|---|---|---|---|
| POC | 4 | 0 | 2 | 10 | 6 | 8 | 16 | 12 | 14 | 22 | 18 | 20 | 28 | 24 | 26 | 34 | 30 | 32 | 40 | 36 | 38 |
| OFFSET | 0 | 0 | 0 | 0 | 0 | 0 | 0 | 0 | 0 | 0 | 0 | 0 | 0 | 0 | 0 | 0 | 0 | 0 | 0 | 0 | 0 |
| LUT INDEX | 4 | 0 | 2 | 10 | 6 | 8 | 16 | 12 | 14 | 22 | 18 | 20 | 28 | 24 | 26 | 34 | 30 | 32 | 40 | 36 | 38 |

FIG. 5 — 500

| FRAME | I2 | B0 | B1 | P5 | B3 | B4 | P8 | B6 | B7 | I11 | B9 | B10 | P14 | B12 | B13 | I17 | B15 | B16 | P20 | B18 | B19 |
|---|---|---|---|---|---|---|---|---|---|---|---|---|---|---|---|---|---|---|---|---|---|
| POC | 4 | 0 | 2 | 10 | 6 | 8 | 16 | 12 | 14 | 22 | 18 | 20 | 28 | 24 | 26 | 34 | 30 | 32 | 40 | 36 | 38 |
| OFFSET | 4 | 4 | 4 | 4 | 4 | 4 | 4 | 4 | 4 | 22 | 22 | 22 | 22 | 22 | 22 | 34 | 34 | 34 | 34 | 34 | 34 |
| LUT INDEX | 8 | 4 | 6 | 14 | 10 | 12 | 20 | 16 | 18 | 44 | 40 | 42 | 50 | 46 | 48 | 7 | 3 | 5 | 13 | 9 | 11 |

FIG. 6 — 600

| FRAME | I2 | B0 | B1 | P5 | B3 | B4 | P8 | B6 | B7 | I11 | B9 | B10 | P14 | B12 | B13 | I17 | B15 | B16 | P20 | B18 | B19 |
|---|---|---|---|---|---|---|---|---|---|---|---|---|---|---|---|---|---|---|---|---|---|
| POC | 4 | 0 | 2 | 10 | 6 | 8 | 16 | 12 | 14 | 22 | 18 | 20 | 28 | 24 | 26 | 34 | 30 | 32 | 40 | 36 | 38 |
| OFFSET | 4 | 4 | 4 | 4 | 4 | 4 | 4 | 4 | 4 | 0 | -4 | -2 | 6 | 2 | 4 | 0 | -4 | -2 | 6 | 2 | 4 |
| LUT INDEX | 8 | 4 | 6 | 14 | 10 | 12 | 20 | 16 | 18 | 22 | 18 | 22 | 28 | 24 | 26 | 18 | 14 | 16 | 24 | 20 | 22 |

BIT-ACCURATE SEED INITIALIZATION FOR PSEUDO-RANDOM NUMBER GENERATORS USED IN A VIDEO SYSTEM

CROSS-REFERENCE TO RELATED APPLICATIONS

This application claims the benefit of U.S. Provisional Application Ser. No. 60/628,500, filed on Nov. 16, 2004 and entitled "BIT ACCURATE SEED INITIALIZATION FOR PSEUDO-RANDOM NUMBER GENERATORS USED IN A VIDEO SYSTEM," which is incorporated by reference herein in its entirety.

FIELD OF THE INVENTION

The present invention relates generally to video encoders and video decoders and, more particularly, to bit-accurate seed initialization for pseudo-random number generators (PRNGs) used for film grain simulation in video systems.

BACKGROUND OF THE INVENTION

Film grain forms in motion picture images during the process of development. Film grain is clearly noticeable in high definition (HD) images and becomes a distinctive cinema trait that should be preserved through the whole image processing and delivery chain. Nevertheless, film grain preservation is a challenge for current encoders since compression gains related to temporal prediction cannot be exploited. Due to the random nature of the grain, visually lossless encoding is only achieved at very high bit-rates. Lossy encoders tend to suppress the film grain when filtering the high frequencies typically associated with noise and fine textures.

Film Grain Management (FGM) has been presented as a new tool that allows encoding the grain in motion picture film by means of a parameterized model to be transmitted as parallel information. To support FGM, the Fidelity Range Extension (FRExt) Amendment to the ITU-T Rec. H.264 | ISO/IEC 14496-10 | MPEG-4 AVC |Joint Video Team (JVT) standard (hereinafter the "H.264 standard") has defined a Film Grain Characteristics Supplemental Enhancement Information (SEI) message. The SEI message describes the film grain characteristics regarding attributes such as size and intensity, and allows a video decoder to simulate the film grain look onto the decoded picture. The H.264 standard specifies which parameters are present in the film grain SEI message, how to interpret the parameters, and the syntax for encoding the SEI message in binary format. However, the H.264 standard does not specify the exact procedure to simulate film grain upon reception of the film grain SEI message. It is to be appreciated that FGM can be used jointly with any other video coding method since it utilizes parallel information, transmitted from an encoder, that does not affect the decoding process.

In FGM, the encoder models the film grain of the video sequence and the decoder simulates the film grain according to the received information. The encoder can use FGM to enhance the quality of the compressed video when there is difficulty retaining the film grain. Additionally, the encoder has the option of removing or attenuating the grain prior to encoding in order to reduce the bit-rate.

Film grain simulation aims at synthesizing film grain samples that simulate the look of original film content. Unlike film grain modeling, which is entirely performed at the encoder, film grain simulation is performed at the decoder. Film grain simulation is done after decoding the video stream and prior to display. Images with added film grain are not used within the decoding process. Being a post-processing method, synthesis of simulated film grain on the decoded images for the display process is not specified in the H.264 standard. The film grain simulation process includes the decoding of film grain supplemental information, transmitted in a film grain SEI message as specified by the Fidelity Range Extensions Amendment of the H.264 standard.

Thus, it is to be appreciated that film grain simulation is a relatively new technology used in post-production to simulate film grain on computer-generated material, as well as during restoration of old film stocks. For these types of applications, there exists commercial software in the market like Cineon®, from Eastman Kodak Co, Rochester, N.Y., and Grain Surgery™, from Visual Infinity. These tools generally operate based on user interaction and are complex to implement, which makes them unsuitable for real-time video coding applications. Furthermore, none of these tools has the capability to interpret a film grain SEI message as specified by the H.264 standard.

A description will now be given regarding pseudo-random number generator (PRNG) seed initialization in accordance with the prior art.

In previous techniques to perform film grain simulation on HD DVD systems, bit-accuracy was only achieved during normal play mode, that is, when the film grain simulation process started at the beginning of the sequence and was not interrupted during the whole decoding processes. During trick mode play, the PRNG used for film grain simulation could be in a different state than during normal play, resulting in a non-bit-accurate film grain reproduction. This means that the same picture could have different grain depending on whether it has been decoded during normal play or during a trick mode play (like fast forward or jump). While this may not always be an issue from a visual quality standpoint (even if the film grain is not bit-accurate, often it visually looks the same), it becomes relevant for test software or hardware implementations because without bit-accuracy it is impossible to compare an obtained result against a reference result.

Thus, in the previous techniques, the difference in film grain reproduction was due to the different state of the PRNG at a given frame depending on how that frame was reached (normal play or trick mode play). This means that even if the same parameters are used on a given picture, if the state of the PRNG is not the same, then different grain is inserted.

Based on the aforementioned Supplemental Enhancement Information (SEI) message, several prior art approaches have been developed relating to specifications for simulating film grain. These prior art approaches target high quality applications and provide large flexibility in the simulation of different film grain patterns on both luma and chroma color components with a small increase in computational cost. However, these prior art approaches do not provide a bit-accurate and H.264 standard compliant film grain simulation process.

Accordingly, it would be desirable and highly advantageous to have methods and apparatus for bit-accurate seed initialization for a pseudo-random number generator (PRNG) used to simulate film grain in a video system. Such methods and apparatus should allow for film grain simulation that is both bit-accurate and H.264 standard compliant.

SUMMARY OF THE INVENTION

These and other drawbacks and disadvantages of the prior art are addressed by the present invention, which is directed to bit-accurate seed initialization for a pseudo-random number generator (PRNG) used to simulate film grain in a video system. The present invention advantageously allows for film grain simulation that is both bit-accurate and H.264 standard compliant.

According to an aspect of the present invention, there is provided a method for initializing a pseudo-random number generator (PRNG) seed for use in a video system. The method includes the steps of creating a look-up table of PRNG seeds, and initializing one of the PRNG seeds from the look-up table for a picture by accessing the look-up table using a value corresponding to an order of the picture.

According to another aspect of the present invention, there is provided a method for initializing a pseudo-random number generator (PRNG) seed for a film grain simulation. The method includes the steps of creating a look-up table of PRNG seeds, and initializing one of the PRNG seeds from the look-up table for a picture by accessing the look-up table using at least one supplemental information value.

According to yet another aspect of the present invention, there is provided a method for transmitting at least one value used to derive a pseudo-random number generator (PRNG) seed. The method includes the step of transmitting the at least one value as supplemental information.

According to a further aspect of the present invention, there is provided a method for transmitting a pseudo-random number generator (PRNG) seed for a film grain simulation. The method includes the step of transmitting the PRNG seed for the film grain simulation in a user data field, wherein the user data field corresponds to a non-H.264 standard encoded user data field.

According to a still further aspect of the present invention, there is provided an apparatus for initializing a pseudo-random number generator (PRNG) seed for use in a video system. The apparatus includes a film grain simulator for creating a look-up table of PRNG seeds, and initializing one of the PRNG seeds from the look-up table for a picture by accessing the look-up table using a value corresponding to an order of the picture.

According to an additional aspect of the present invention, there is provided an apparatus for initializing a pseudo-random number generator (PRNG) seed for a film grain simulation. The apparatus includes a film grain simulator for creating a look-up table of PRNG seeds, and initializing one of the PRNG seeds from the look-up table for a picture by accessing the look-up table using at least one supplemental information value.

According to a still additional aspect of the present invention, there is provided an apparatus for transmitting at least one value used to derive a pseudo-random number generator (PRNG) seed. The apparatus includes a film grain modeler for transmitting the at least one value as supplemental information.

According to a yet additional aspect of the present invention, there is provided an apparatus for transmitting a pseudo-random number generator (PRNG) seed for a film grain simulation. The apparatus includes a film grain modeler for transmitting the PRNG seed for the film grain simulation in a user data field, wherein the user data field corresponds to a non-H.264 standard encoded user data field.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

The present invention is directed to bit-accurate seed-initialization for a pseudo-random number generator (PRNG) used to simulate film grain in a video system. The present invention may be employed to initialize a PRNG seed, e.g., upon reception of a new film grain Supplemental Enhancement Information (SEI) message and at the beginning of each picture prior to performing film grain simulation.

Advantageously, the present invention allows for film grain simulation that is both bit-accurate and H.264 standard compliant. Moreover, the present invention advantageously may be used for film grain simulation during normal play and trick mode play. That is, unlike the prior art, the state of the PRNG is the same, independent of the reproduction mode (e.g., normal play, trick mode play).

Film grain simulation is performed after decoding the video bit-stream and prior to pixel display. The film grain simulation process may involve the decoding of film grain supplemental information transmitted, e.g., in a film grain SEI message as specified by the FRExt Amendment to the H.264 standard.

The-present description illustrates the principles of the present invention. It will thus be appreciated that those skilled in the art will be able to devise various arrangements that, although not-explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 1:
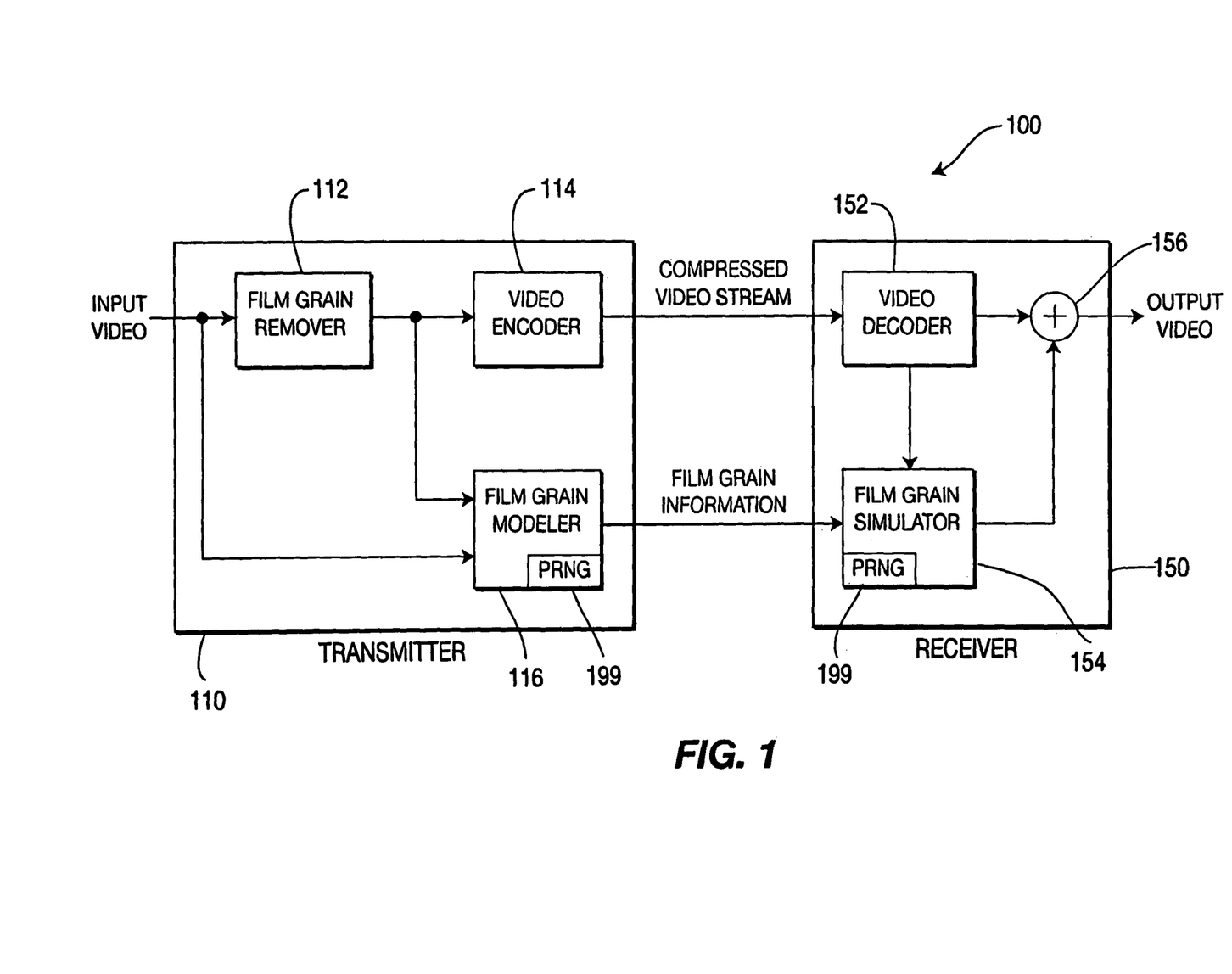
FIG. 1 is a block diagram illustrating a Film Grain Management (FGM) processing chain to which the present invention may be applied.

Turning to FIG. 1, a Film Grain Management (FGM) processing chain to which the present invention may be applied is indicated generally by the reference numeral 100. The FGM processing chain includes a transmitter 110 and a receiver 150. The transmitter includes a film grain remover 112, a video encoder 114, and a film grain modeler 116. The receiver 150 includes a video decoder 152, a film grain simulator 154, and a combiner 156 (shown as a summing device, but other means for combining the output of the video decoder 152 and film grain simulator 154 are also contemplated as being within the scope of the invention).

An input to the transmitter 110 is connected in signal communication with an input of the film grain remover 112 and a first input of the film grain modeler 116. An output of the film grain remover 112 is connected in signal communication with an input of the video encoder 114 and a second input of the film grain modeler 116. An output of the video encoder 114 is available as a first output of the transmitter 110. An output of the film grain modeler 116 is available as a second output of the transmitter 110. The first output of the transmitter 110 is connected in signal communication with a first input of the receiver 150. The second output of the transmitter 110 is connected in signal communication with a second input of the receiver 150. The first input of the receiver 150 is connected in signal communication with an input of the video decoder 152. The second input of the receiver 150 is connected in signal communication with a first input of the film grain simulator 154. A first output of the video decoder 152 is connected in signal communication with a second input of the film grain simulator 154. A second output of the video decoder 152 is connected in signal communication with a first input of the combiner 156. An output of the film grain simulator is connected in signal communication with a second input of the combiner 156. An output of the combiner 156 is available as an output of the receiver 150.

It is to be appreciated that in some embodiments of the present invention, PRNG seeds for film grain simulation are generated at the receiver 150 (in particular, by the film grain simulator 154), while in other embodiments, the PRNG seeds for film grain simulation are generated at the transmitter 110 (in particular, by the film grain modeler 116) and transmitted to the receiver 150 for use thereby. Moreover, in yet other embodiments, a PRNG seed generated at the transmitter 110 is sent to the receiver 150 for combining with a PRNG seed generated at the receiver 150 to obtain a new PRNG seed for use for a current picture for which film grain simulation is to be performed. Thus, for illustrative purposes, both the film grain modeler 116 and the, film grain simulator 154 shown in FIG.1 include a pseudo-random number generator 199 for use in accordance with the principles of the present invention. Of course, depending on the embodiment, only one of the film grain modeler 116 and the film grain simulator 154 need include a PRNG. Given the teachings of the present invention provided herein, one of ordinary skill in this and related arts will contemplate these and other variations to a transmitter and receiver (and, in particular, to a film grain modeler and a film grain simulator), while maintaining the spirit of the present invention.

Regarding the prior art, to overcome the above-described difference in the prior art regarding the state of the pseudo-random number generator (particularly when transitioning from normal playback to trick mode play) and the associated resulting prior art problem of inserting a different grain, a bit-accurate method is proposed to initialize the PRNG's seed at the beginning of each picture that is not dependant on the play mode. The bit-accurate methods described herein in accordance with the principles of the present invention advantageously are also compliant with the H.264 standard.

A description will now be given regarding a first illustrative embodiment in accordance with the principles of the present invention. The first illustrative embodiment is described initially and is then followed by a further description of a corresponding method shown and described with respect to FIG. 2 and an example thereof shown and described with respect to FIG. 3.

Figure 2:
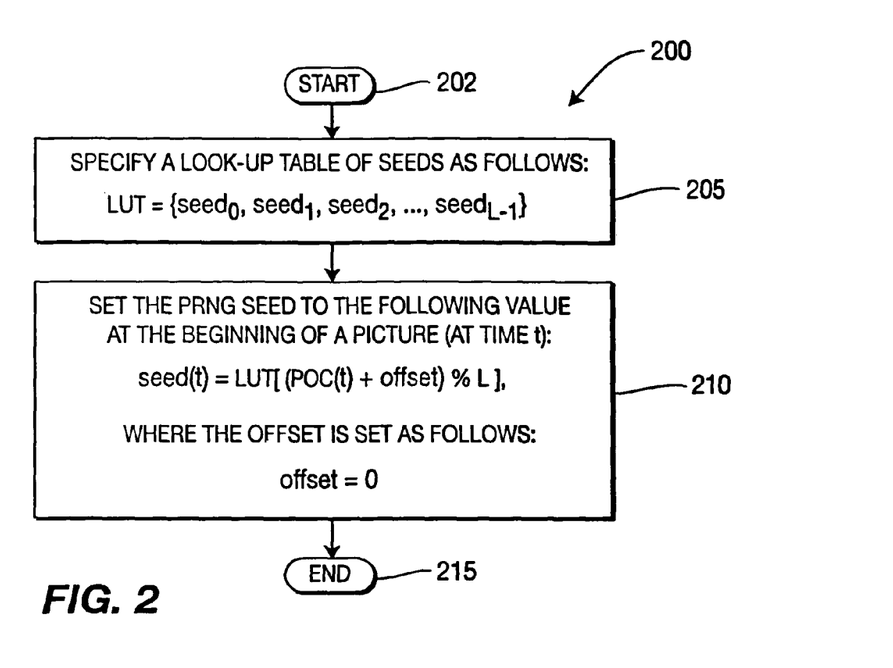
FIG. 2 is a flow diagram illustrating a method for bit-accurate seed initialization for a pseudo-random number generator (PRNG) for film grain simulation in a video system in accordance with the principles of the present invention.

A look-up table (LUT) of seeds is defined as follows:

$$LUT2 \{seed_0, seed_1, seed_2, \ldots, seed_{L-1}\}$$

where $seed_i$ is a possible seed for the PRNG, and L is the number of possible, seeds. While not mandatory, to ensure proper randomness, L should be equal to or larger than the maximum distance (in pictures) between consecutive film grain SEI messages. In a particular embodiment where a 32-bit register is used to implement the PRNG, seed, will be a 32-bit integer value.

Then, the PRNG seed is set to the following value at the beginning of a picture (at time t):

$$seed(t)=LUT[(POC(t)+\text{offset}) \% L]$$

where POC(t) is the picture order count of the picture at time t as defined in the H.264 standard, L is the length of the look-up table, and offset is a value set upon reception of a new film grain SEI message. In order to avoid repeating the same sequence of indices when accessing the LUT, L may be equal to a prime number, like 61 or 127.

In the first illustrative embodiment, the offset is set as follows:

$$\text{offset}=0$$

This provides a very simple way of determining the PRNG seed because only the POC of the current picture is needed, which is already known by the decoder. Besides, since the picture order count (POC) of a given picture will always be the same regardless of how the picture is reached, the same seed will be used on any play mode.

Turning to FIG. 2, a method for bit-accurate seed initialization for a pseudo-random number generator (PRNG) for film grain simulation in a video system is indicated generally by the reference numeral 200.

The method 200 includes a start block 202 that passes control to a function block 205. The function block 205 specifies a look-up table of seeds as follows:

$$LUT=\{seed_0, seed_1, seed_2, \ldots, seed_{L-1}\}$$

and passes control to a function block 210.

The function block 210 sets the PRNG seed to the following value at the beginning of a picture (at time t):

$$seed(t)=LUT[(POC(t)+\text{offset}) \% L].$$

Further regarding function block 210, the offset is set as follows $$\text{offset}=0$$

and control is passed to an end block 215.

Figure 3:
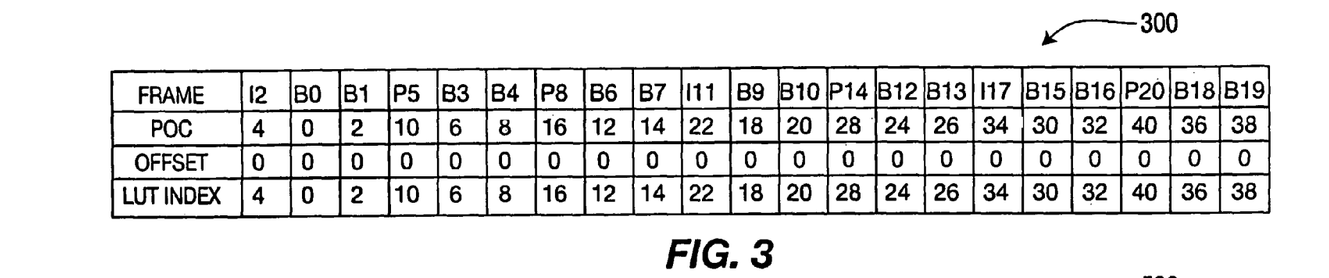
FIG. 3 is a diagram illustrating an exemplary look-up table (LUT) index computation in accordance with the principles of the present invention.

Turning to FIG. 3, an example of a look-up table (LUT) index computation is indicated generally by the reference numeral 300. In particular, the LUT index computation is for a case where L=61 and the offset=0.

A description will now be given regarding a second illustrative embodiment in accordance with the principles of the present invention. The second illustrative embodiment is described initially and is then followed by a further description of a corresponding method shown and described with respect to FIG. 4 and examples thereof shown and described with respect to FIGS. 5 and 6.

Figure 4:
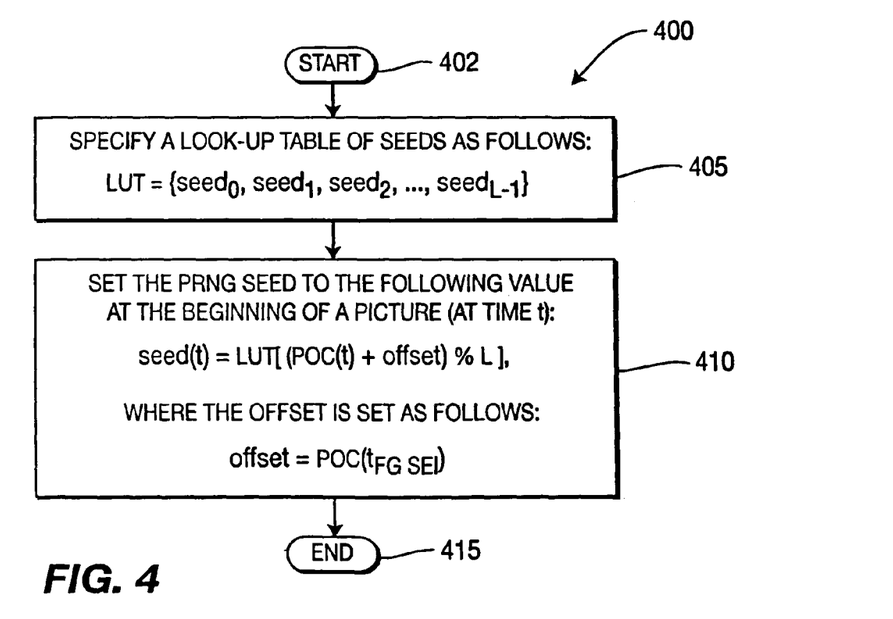
FIG. 4 is a flow diagram illustrating another method for bit-accurate seed initialization for a pseudo-random number generator (PRNG) for film grain simulation in a video system in accordance with the principles of the present invention.

For sequences with frequent POC resets, the previous approach described With respect to FIG. 2 it is not very efficient because the same sequence of seeds will be reused on consecutive frames. For those cases, the second illustrative embodiment is disclosed where the offset is equal to the POC value of the picture where the film grain SEI message is inserted before resetting the POC, as follows:

$$\text{offset}=POC(t_{FG\ SEI})$$

This approach is only slightly more complex (utilizes two POCs) but it yields a different sequence of seeds even after a POC reset, provided that resets do not occur at a steady pace.

Turning to FIG. 4, a method for bit-accurate seed initialization for a pseudo-random number generator (PRNG) for film grain simulation in a video system is indicated generally by the reference numeral 400.

The method 400 includes a start block 402 that passes control to a function block 405. The function block 405 specifies a look-up table of seeds as follows:

$$LUT=\{seed_0, seed_1, seed_2, \ldots, seed_{L-1}\}$$

and passes control to a function block 410.

The function block 410 sets the PRNG seed to the following value at the beginning of a picture (at time t) where the film grain SEI is inserted before resetting the POC as follows:

$$seed(t)=LUT[(POC(t)+\text{offset}) \% L].$$

Further regarding function block 410, the offset is set as follows $$\text{offset}=POC(t_{FG\ SEI})$$

where, as noted above, $POC(t_{FG\ SEI})$ is equal to the POC value of the picture where the film grain SEI message is inserted before resetting the POC. The function block 410 then passes control to an end block 415.

Figure 5:
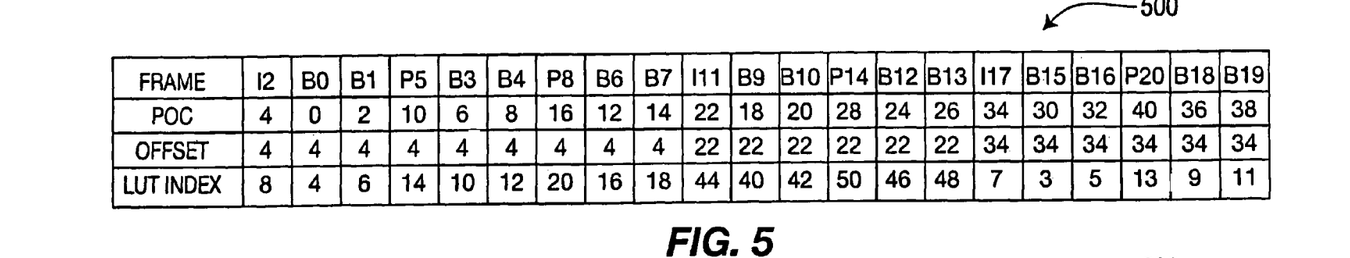
FIG. 5 is a diagram illustrating another exemplary look-up table (LUT) index computations in accordance with the principles of the present invention.
Figure 6:
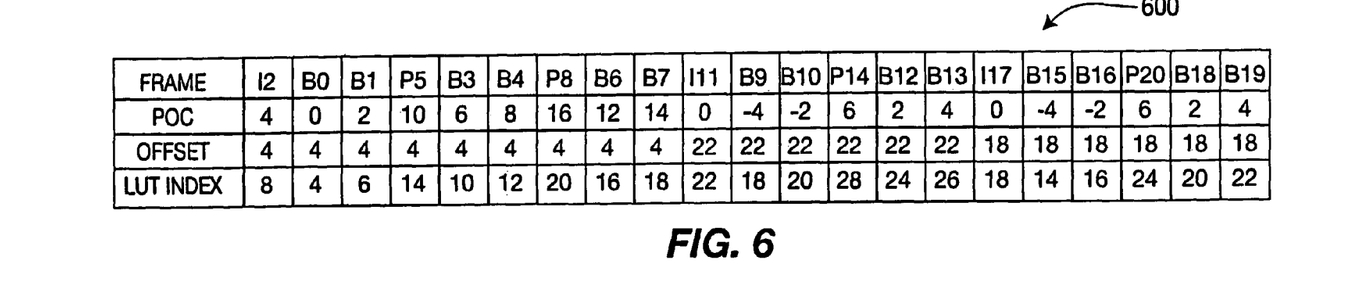
FIG. 6 is a diagram illustrating yet another exemplary look-up table (LUT) index computations in accordance with the principles of the present invention.

Turning to FIGS. 5 and 6, examples of look-up table (LUT) index computations are indicated generally by the reference numerals 500 and 600, respectively. In particular, FIG. 5 represents an LUT index computation for L=61, offset=POC $(t_{FG\ SEI})$, and FIG. 6 represents an LUT index computation for L=61, offset=POC($t_{FG\ SEI}$) with POC resets. It is to be noted that the index used to access the LUT should be positive. If it is negative (for instance, because of a negative POC value), then the absolute value may be used as the index.

Figure 7:
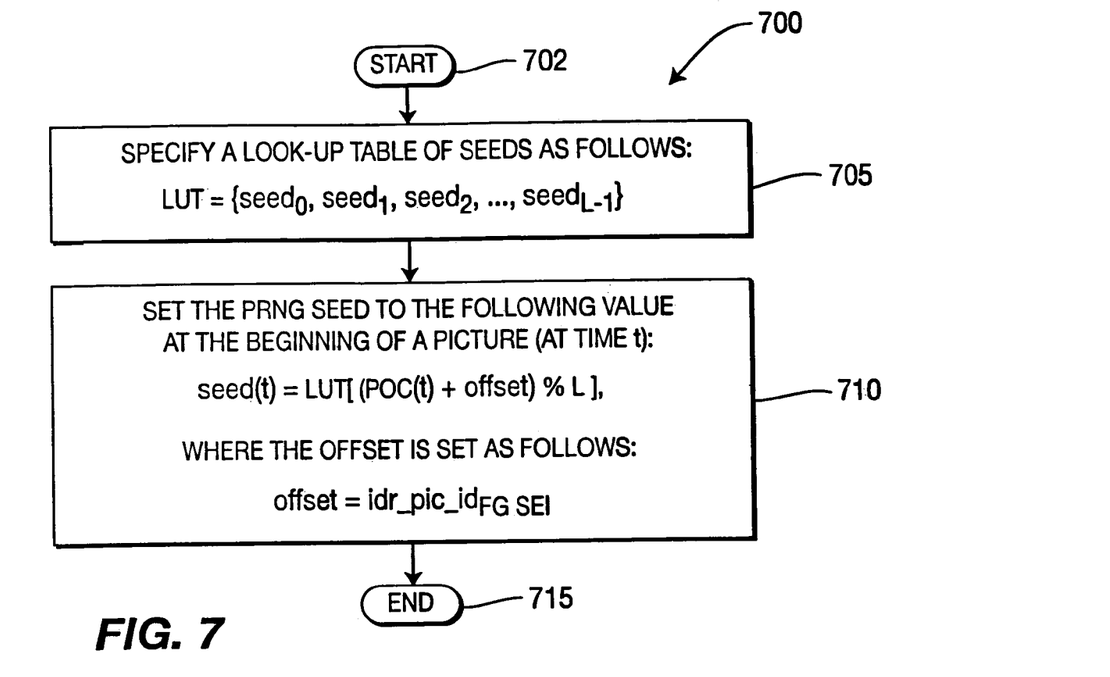
FIG. 7 is a flow diagram illustrating a further method for bit-accurate seed initialization for a pseudo-random number generator (PRNG) for film grain simulation in a video system in accordance with the principles of the present invention.

In order to deal with sequences with frequent and steady POC resets due to Instantaneous Decoding Refresh (IDR) pictures, the idr_pic_id parameter sent in the slice header of H.264 | MPEG AVC bit streams can also be used to determine the offset. For example, the following equation may be used to calculate the offset:

$$\text{offset}=\text{idr\_pic\_id}_{FG\ SEI}$$

where idr_pic_id$_{FG\ SEI}$ is the picture identification number of the last IDR picture where the film grain SEI has been inserted. Of course, given the teachings of the present invention provided herein, the preceding and the following equations for calculating offset may be used as well as variations thereof while maintaining the spirit and scope of the present invention.

Turning to FIG. 7, a method for bit-accurate seed initialization for a pseudo-random number generator (PRNG) for film grain simulation in a video system is indicated generally by the reference numeral 700.

The method 700 includes a start block 702 that passes control to a function block 705. The function block 705 specifies a look-up table of seeds as follows:

$$LUT=\{seed_0, seed_1, seed_2, \ldots, seed_{L-1}\}$$

and passes control to a function block 710.

The function block 710 sets the PRNG seed to the following value at the beginning of a picture (at time t) where the film grain SEI is inserted before resetting the POC as follows:

$$seed(t)=LUT[(POC(t)+offset) \% L].$$

Further regarding function block 710, the offset is set as follows $$offset=idr\_pic\_id_{FG\,SEI}$$

where, as noted above, $idr\_pic\_id_{FG\,SEI}$ is the picture identification number of the last IDR picture where the film grain SEI has been inserted. The function block 710 then passes control to an end block 715.

A description will now be given regarding a third illustrative embodiment in accordance with the principles of the present invention. The third illustrative embodiment is described initially and is then followed by a further description of a corresponding method shown and described with respect to FIG. 8.

Figure 8:
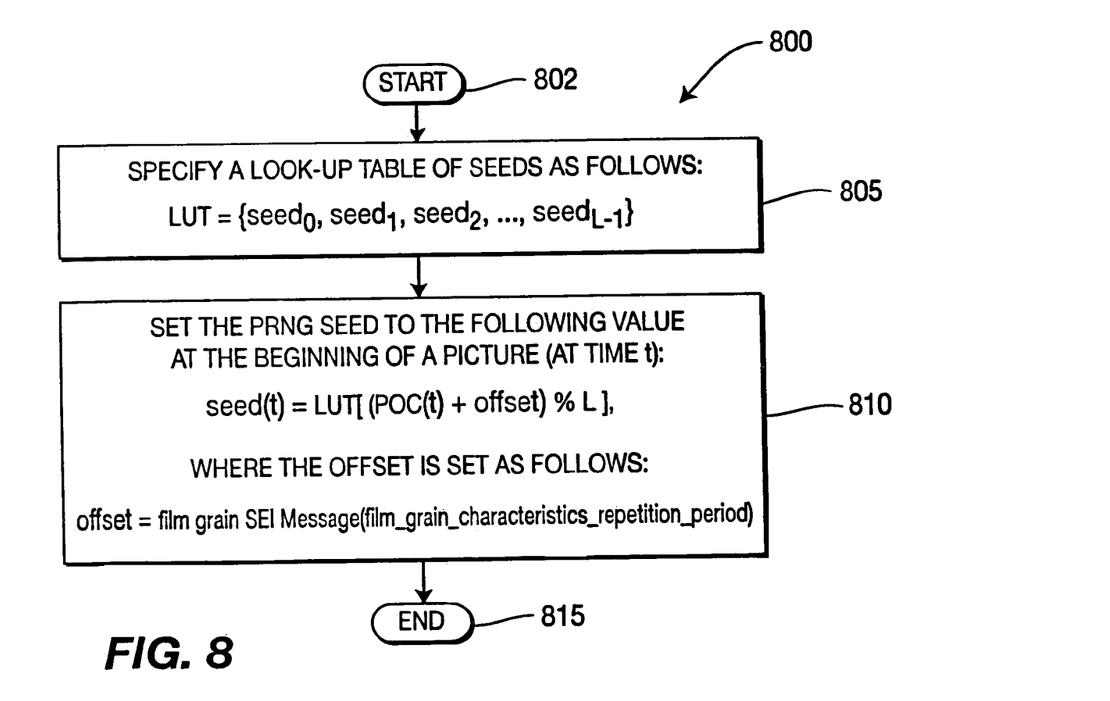
FIG. 8 is a flow diagram illustrating a still further method for bit-accurate seed initialization for a pseudo-random number generator (PRNG) for film grain simulation in a video system in accordance with the principles of the present invention.

The third embodiment is directed to sequences with frequent and steady POC resets, and provides for use of the film grain repetition period parameter transmitted in the film grain SEI. The offset is defined as:

$$offset=\text{film grain } SEI \text{ message(film\_grain\_characteristics\_repetition\_period)}$$

where the film grain characteristics repetition period parameter is larger than or equal to the maximum distance between consecutive film grain SEI messages. It is to be noted that even if the film grain characteristics repetition period was not intended for this use, this approach is still compliant with the H.264 standard.

Turning to FIG. 8, a method for bit-accurate seed initialization for a pseudo-random number generator (PRNG) for film grain simulation in a video system is indicated generally by the reference numeral 800.

The method 800 includes a start block 802 that passes control to a function block 805. The function block 805 specifies a look-up table of seeds as follows:

$$LUT=\{seed_0, seed_1, seed_2, \ldots, seed_{L-1}\}$$

and passes control to a function block 810.

The function block 810 sets the PRNG seed to the following value at the beginning of picture (at time t):

$$seed(t)=LUT[(POC(t)+offset) \% L].$$

Further regarding function block 810, the offset is set as follows $$offset=\text{film grain } SEI \text{ message(film\_grain\_characteristics\_repetition\_period)}$$

and control is passed to an end block 815.

A description will now be given regarding a fourth illustrative embodiment in accordance with the principles of the present invention. The fourth illustrative embodiment is described initially and is then followed by a further description of a corresponding method shown and described with respect to FIG. 9.

Figure 9:
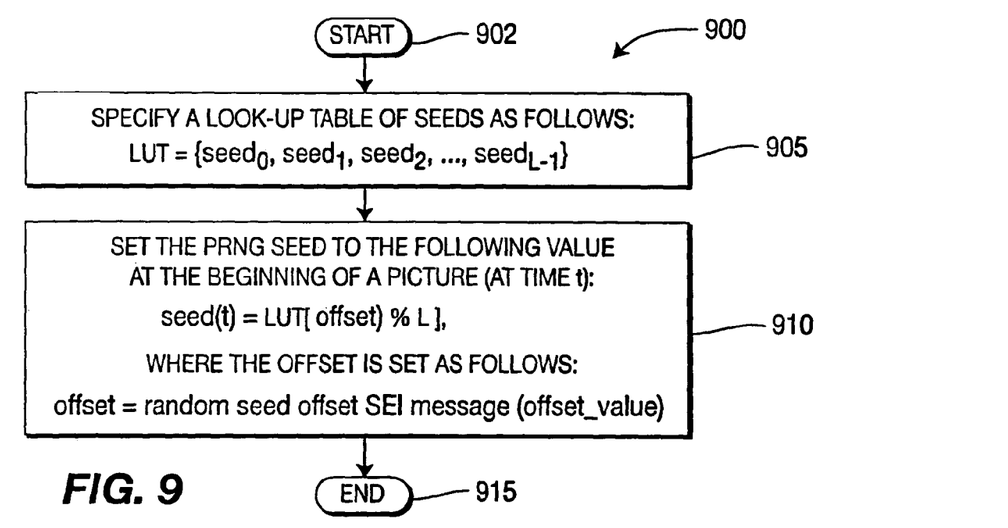
FIG. 9 is a flow diagram illustrating a yet further method for bit-accurate seed initialization for a pseudo-random number generator (PRNG) for film grain simulation in a video system in accordance with the principles of the present invention.

In the fourth embodiment, the offset is conveyed in a separate SEI message, transmitted preceding the same picture than the film grain characteristics SEI message. The additional SEI message, which for clarity is named random seed offset SEI message, would contain, among other possible information, the offset value to be used in the seed initialization process. According to the fourth embodiment, the offset is calculated as follows:

$$offset=\text{random+seed offset } SEI \text{ message(offset\_value)}$$

The random seed offset SEI could be either an unregistered user data SEI message, a registered user data SEI message or a reserved SEI message. It is to be noted it is also possible to transmit the random seed offset SEI message for every picture, even if no film grain SEI message is sent. In this case, the LUT of seeds is accessed as follows:

$$seed(t)=LUT[offset \% L]$$

This approach does not rely on the POC number so it is robust in front of POC resets. (memory management control operation, or MMCO, commands) and Instantaneous Decoding Refresh (IDR) pictures. Moreover, this approach or a similar approach based on the teachings provided herein may be combined with other video coding algorithms like MPEG-2 or VC-1. MPEG-2 time stamps, for example, could be used to compute a POC-like value for the frame where the film grain parameters have been transmitted and the picture output index could be used as the offset.

Turning to FIG. 9, a method for bit-accurate seed initialization for a pseudo-random number generator (PRNG) for film grain simulation in a video system is indicated generally by the reference numeral 900.

The method 900 includes a start block 902 that passes control to a function block 905. The function block 905 specifies a look-up table of seeds as follows:

$$LUT=\{seed_0, seed_1, seed_2, \ldots, seed_{L-1}\}$$

and passes control to a function block 910.

The function block 910 sets the PRNG seed to the following value at the beginning of picture (at time t):

$$seed(t)=LUT[offset \% L]$$

Further regarding function block 910, the offset is set as follows $$offset=\text{random seed offset } SEI \text{ message(offset\_value)}$$

and control is passed to an end block 915.

A description winnow be given regarding a fifth illustrative embodiment in accordance with the principles of the present invention. The fifth illustrative embodiment is described initially and is then followed by a further description of a corresponding method shown and described with respect to FIG. 10.

Figure 10:
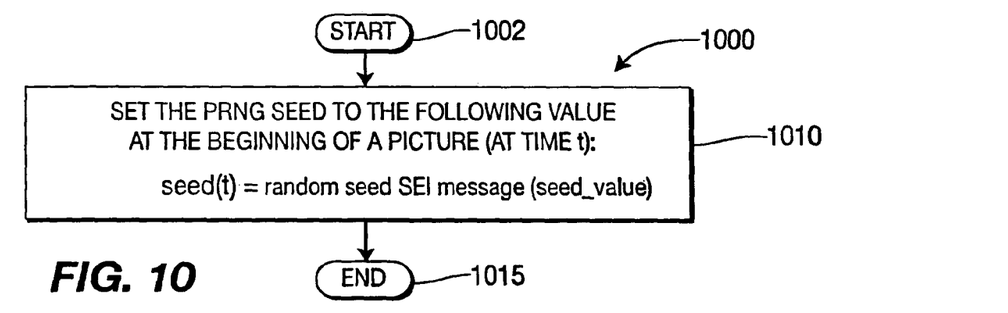
FIG. 10 is a flow diagram illustrating an additional method for bit-accurate seed initialization for a pseudo-random number generator (PRNG) for film grain simulation in a video system in accordance with the principles of the present invention.

In the fifth illustrative embodiment, a random seed SEI message is defined with the random seed to be used on that frame. The seed at time t is initialized as follows:

$$seed(t)=\text{random seed } SEI \text{ message(seed\_value)}$$

As before, the user data SEI message used to convey the seed value could be either an unregistered user data SEI message, a registered user data SEI message or a reserved SEI message. When video coding algorithms other than the H.264 standard are used, the seed value can be transmitted as user data. It is to be noted that this approach does not make use of a LUT table and does not rely on POC values, but utilizes a random seed SEI message that is transmitted on each picture. It is to be appreciated that it is also possible to combine this approach with a LUT based on POC.

Turning to FIG. 10, a method for bit-accurate seed initialization for a pseudo-random number generator (PRNG) for film grain simulation in a video system is indicated generally by the reference numeral 1000.

The method 1000 includes a start block 1002 that passes control to a function block 1010. The function block 1010 initializes a seed at time t as follows:

seed(*t*)=random seed *SEI* message(seed_value).

Further regarding function block 1010, control is passed to an end block 1015.

A description will now be given regarding a sixth illustrative embodiment in accordance with the principles of the present invention. The sixth illustrative embodiment is described initially and is then followed by a further description of a corresponding method shown and described with respect to FIG. 11.

Figure 11:
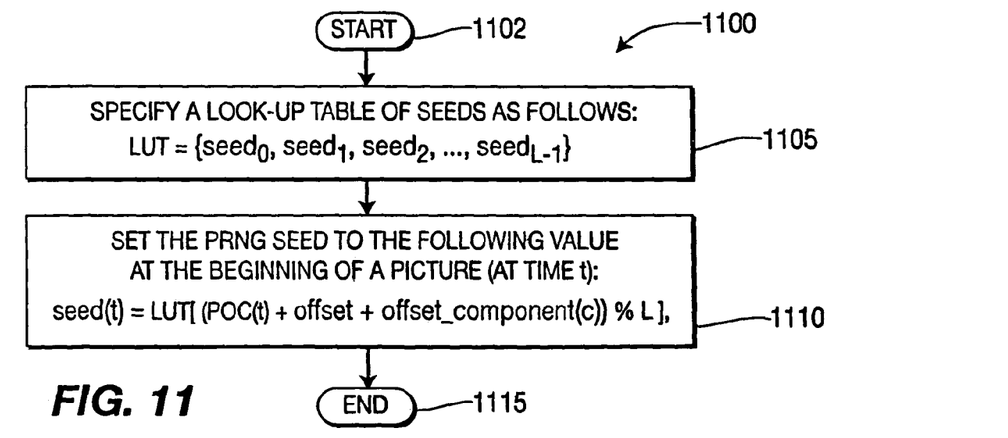
FIG. 11 is a flow diagram illustrating yet an additional method for bit-accurate seed initialization for a pseudo-random number generator (PRNG) for film grain simulation in a video system in accordance with the principles of the present invention.

When multiple PRNGs are used (for example, one per color component), the same LUT table may be used for all of them, defining a fixed, additional offset for each color component as follows:

seed(*t*)=*LUT*[((POC(*t*)+offset+offset_component (*c*)) % *L*]

where offset_component(c) is the offset for color component c. offset is a value tied to the picture at time t that can be conveyed using any of the embodiments previously described. In one illustrative extension to the fifth illustrative embodiment, these offsets could be $\{0, \frac{1}{3}L, \frac{2}{3}L\}$. It is to be appreciated that these offsets are constant and, thus they do not need to be transmitted nor updated. Moreover, it is to be appreciated that the present invention is not limited to the preceding offsets and, thus, other offsets may also be used in accordance with the principles of the present invention while maintaining the spirit of the present invention.

Turning to FIG. 11, a method for bit-accurate seed initialization for a pseudo-random number generator (PRNG) for film grain simulation in a video system is indicated generally by the reference numeral 1100.

The method 1100 includes a start block 1102 that passes control to a function block 1105. The function block 1105 specifies a look-up table of seeds as follows:

$LUT=\{seed_0, seed_1, seed_2, \ldots, seed_{L-1}\}$ and passes control to a function block 1110.

The function block 1110 sets the PRNG seed to the following value at the beginning of picture, (at time t), when multiple PRNGs are used (e.g., one per color component) so that when the same LUT is used for all of the multiple PRNGs, the following fixed, additional offset is defined for each, e.g., color component as follows:

seed(*t*)=*LUT*[(POC(*t*)+offset+offset_component(*c*)) % *L*]

where offset_component(c) is the offset for color component c, and offset is the offset for picture at time t.

Further regarding function block 1110, control is passed to an end block 1115.

As noted above, given the teachings of the present invention provided herein, the present invention may be applied to other video encoding/decoding techniques that can benefit from the preservation of film grain while maintaining the spirit of the present invention.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output.("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A method for initializing a seed for a pseudo-random number generator (PRNG) for use in a video system, comprising the steps of:
    creating (205) for the pseudo-random number generator a look-up table of PRNG seeds; and
    initializing (210) one of the PRNG seeds for the pseudo-random number generator from the look-up table for a picture, by accessing the look-up table using a value corresponding to an order of the picture.

2. The method of claim 1, wherein the value corresponding to the order of the picture is a picture order count (POC) value (210).

3. The method of claim 1, wherein the order of the picture is an intended display order.

4. The method of claim 1, wherein the order of the picture is an intended decode order.

5. The method of claim 1, wherein the method is used for film grain simulation.

6. The method of claim 1, wherein the method is bit accurate.

7. The method of claim 1, wherein said initializing step further uses a picture order count (POC) value of a picture to access the look-up table (210).

8. The method of claim 7, wherein the film grain supplemental information message is provided in a Supplemental Enhancement Information (SEI) message.

9. The method of claim 7, wherein the POC value of the picture is used to access the look-up table when a number of POC resets in a corresponding video sequence is greater than a threshold.

10. The method of claim 1, wherein said initializing step further uses an idr_pic_id parameter of an Instantaneous Decoding Refresh (IDR) picture to access the look-up table (710).

11. The method of claim 10, wherein a picture order count (POC) value of the picture is used to access the look-up table when a number of POC resets in a corresponding video sequence is greater than a threshold.

12. The method of claim 1, wherein said initializing step further uses a film_grain_characteristics_repetition_period parameter transmitted in a film grain Supplemental Enhancement Information (SEI) message to access the look-up table (810).

13. The method of claim 1, wherein a state of the one of the initialized PRNG seeds is independent of a reproduction mode of a current picture.

14. A method for initializing a seed for a pseudo-random number generator (PRNG) for a film grain simulation, comprising the steps of:
   creating (905) for the pseudo-random number generator a look-up table of PRNG seeds; and
   initializing (910) one of the PRNG seeds for the pseudo-random number generator from the look-up table for a picture, by accessing the look-up table using at least one supplemental information value.

15. The method of claim 14, wherein said supplemental information value is included within a supplemental enhancement information (SEI) message.

16. An apparatus for initializing a pseudo-random number generator (PRNG) seed for use in a video system, comprising a film grain simulator (154) for creating a look-up table of PRNG seeds, and initializing one of the PRNG seeds from the look-up table for a picture by accessing the look-up table using a value corresponding to an order of the picture.

17. The apparatus of claim 16, wherein the value corresponding to the order of the picture is a picture order count (POC) value.

18. The apparatus of claim 16, wherein the order of the picture is an intended display order.

19. The apparatus of claim 16, wherein the order of the picture is an intended decode order.

20. The apparatus of claim 16, wherein the one of the PRNG seeds is used for film grain simulation.

21. The apparatus of claim 16, wherein the simulating of film grain is bit accurate.

22. The apparatus of claim 16, wherein said film grain simulator (154) further uses a picture order count (POC) value of a picture to access the look-up table.

23. The apparatus of claim 22, wherein the film grain supplemental information message is provided in a Supplemental Enhancement Information (SEI) message.

24. The apparatus of claim 22, wherein the POC value of the picture is used to access the look-up table when a number of POC resets in a corresponding video sequence is greater than a threshold.

25. The apparatus of claim 16, wherein said film grain simulator (154) further uses an idr_pic_id parameter of an Instantaneous Decoding Refresh (IDR) picture to access the look-up table.

26. The apparatus of claim 25, wherein a picture order count (POC) value of the picture is used to access the look-up table when a number of POC resets in a corresponding video sequence is greater than a threshold.

27. The apparatus of claim 16, wherein said film grain simulator (154) further uses a film_grain_characteristics_repetition_period parameter transmitted in a film grain Supplemental Enhancement Information (SEI) message to access the look-up table.

28. The apparatus of claim 16, wherein a state of the one of the initialized PRNG seeds is independent of a reproduction mode of a current picture.

29. An apparatus for initializing a pseudo-random number generator (PRNG) seed for a film grain simulation, comprising a film grain simulator (154) for creating a look-up table of PRNG seeds, and initializing one of the PRNG seeds from the look-up table for a picture by accessing the look-up table using at least one supplemental information value.

30. The apparatus of claim 29, wherein said supplemental information value is included within a supplemental enhancement information (SEI) message.

31. An apparatus for initializing a pseudo-random number generator (PRNG) seed for use in a video system, comprising:
   means (154) for creating a look-up table of PRNG seeds; and
   means (154) for initializing one of the PRNG seeds from the look-up table for a picture, by accessing the look-up table using a value corresponding to an order of the picture.

32. The apparatus of claim 31, wherein the value corresponding to the order of the picture is a picture order count (POC) value.

33. The apparatus of claim 31, wherein the order of the picture is an intended display order.

34. The apparatus of claim 31, wherein the order of the picture is an intended decode order.

35. The apparatus of claim 31, wherein the one of the PRNG seeds is used for film grain simulation.

36. The apparatus of claim 31, wherein the simulating of film grain is bit accurate.

37. The apparatus of claim 31, wherein said initializing means (154) further uses a picture order count (POC) value of a picture to access the look-up table.

38. The apparatus of claim 37, wherein the film grain supplemental information message is provided in a Supplemental Enhancement Information (SEI) message.

39. The apparatus of claim 37, wherein the POC value of the picture is used to access the look-up table when a number of POC resets in a corresponding video sequence is greater than a threshold.

40. The apparatus of claim 31, wherein said initializing means (154) further uses an idr_pic_id parameter of an Instantaneous Decoding Refresh (IDR) picture to access the look-up table.

41. The apparatus of claim 40, wherein a picture order count (POC) value of the picture is used to access the look-up table when a number of POC resets in a corresponding video sequence is greater than a threshold.

42. The apparatus of claim 31, wherein said initializing means (154) further uses a film_grain_characteristics_ repetition_period parameter transmitted in a film grain Supplemental Enhancement Information (SEI) message to access the look-up table.

43. The apparatus of claim 31, wherein a state of the one of the initialized PRNG seeds is independent of a reproduction mode of a current picture.

44. An apparatus for initializing a pseudo-random number generator (PRNG) seed for a film grain simulation, comprising:

means (154) for creating a look-up table of PRNG seeds; and     means (154) for initializing one of the PRNG seeds from the look-up table for a picture, by accessing the look-up table using at least one supplemental information value.

45. The apparatus of claim 44, wherein said supplemental information value is included within a supplemental enhancement information (SEI) message.

* * * * *